March 11, 1930. J. C. GORDON 1,750,002
APPARATUS FOR HANDLING DOUGH
Filed Feb. 15, 1929
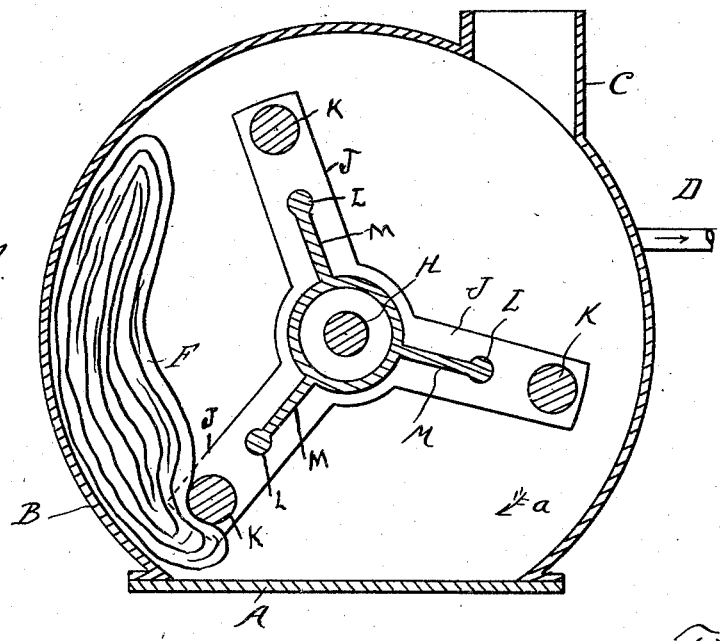
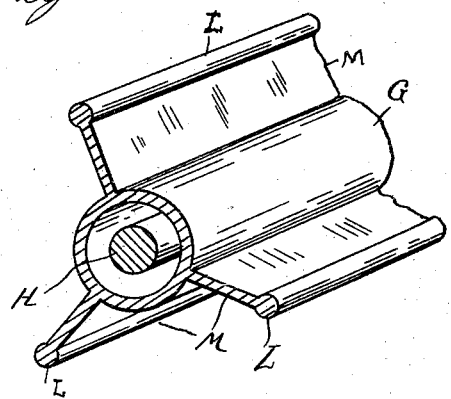
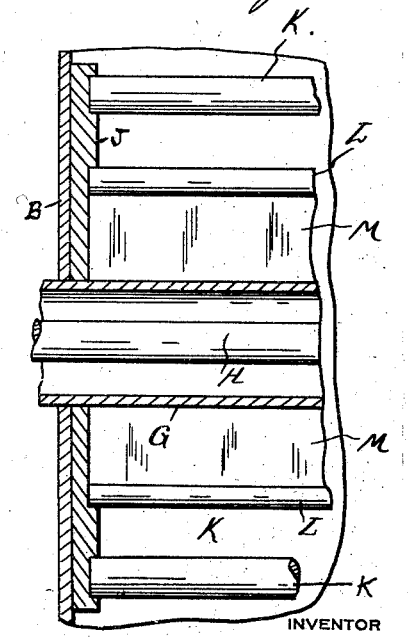
INVENTOR
James C. Gordon
BY
ATTORNEYS Patented Mar. 11, 1930

1,750,002

UNITED STATES PATENT OFFICE

JAMES C. GORDON, OF DETROIT, MICHIGAN

APPARATUS FOR HANDLING DOUGH

Application filed February 15, 1929. Serial No. 340,068.

This invention relates to apparatus for handling dough incident to its preparation for baking in the form of bread, cake or the like, and has for its object an improved organization of parts directed particularly to the maintenance, in cooperation with the strictly dough-handling members, of a relatively low and uniform temperature in the mass of dough. It has for a long time been recognized that undue or unequal heating of the dough mass while being manipulated or kneaded exercises a harmful influence upon it as regards the satisfactory character of the finished baking. Efforts to counteract this have taken numerous forms, such as provision of a forced draft regulatably passing through the container or mixing chamber to a suitable outlet, and the use of a hollow shaft whereon the dough-kneading wheel is journaled, the walls of the shaft being perforated so as to permit the escape of a multiplicity of small jets of air fed thereto from an external refrigerating source. The fault of the former lies in the direction of inability to uniformly effect the diffusion of the entering air to the proper portions of the container so as to adequately exert a cooling influence upon the dough, while the provision of the small jets emanating from the hollow shaft has encountered the objection of either of these holes becoming filled or clogged, or in the cases where they remain open and clear, very frequently liquid particles from the refrigerant blast have made their way from the external cooling source through the hollow shaft and through the holes and into the mass of dough, which is, of course, highly objectionable. The avoidance of these and similar operative objections, whether a centrally furnished cooling source is used or reliance is merely placed upon suitably placed air inlet and connections in the shell of the casing is used, or where these ideas are used conjointly, is the object of the present invention.

In the drawings:

Figure 1 is a sectional elevational view of my improved dough handling apparatus taken transversely of the axis of the shaft and of the preferably cylindrical container.

Figure 2 is a perspective of the beater and the air agitating blades.

Figure 3 is a fragmentary elevational view of a part of the dough beater, bringing out the relation of the air-scattering plates to the other parts thereof.

Upon the base or table A is mounted the preferably cylindrical casing or container B, which is provided with a suitable ventilating air inlet C and an exhaust outlet D. Both of these latter are preferably located at such an elevation relatively to the container B and on such a side thereof that combined with the general direction in which the mass of dough is driven by the beating of the arms of the several dough manipulating arms and rods they are either entirely above the level to which the dough mass as F is ordinarily driven, as by the rotation of the agitating member in the direction shown by the arrow $a$, or else, and possibly as well, located on the opposite side of the container from that to which the dough mass is normally driven. In the embodiment herein illustrated, the dough-agitating member is composed of a hollow shaft G, terminally supported by means of trunnions H in suitable bearings in the end of the container B. When a hollow shaft is used, it is continued in the form of suitable pipe connections from and returning to a suitable external source from which low temperatured brine, ammonia, or the like is driven through the hollow shaft G. From the hub thus constituted by the hollow shaft G there project a plurality of radial arms, as J, whose ends are sufficiently spaced from the interior periphery of the container B so that the dough mass F can yieldingly pass beneath the ends and beneath the dough-rolling bars K, which are supported near the ends of the several arms J. These spiders or supporting frames constituted by the arms J are preferably located adjacent the ends of the container B, so that the dough-engaging bars K are of only slightly lesser length than that of the container itself. Access to the interior of the casing or container B, for introduction of the dough mass thereinto and for its removal therefrom, may be had through a conveniently placed door-closed aperture in either an end of the casing or in its rounded side.

It is within the intended scope of this disclosure, however, to sometimes refrain from the use of hollow shaft, provided an adequate inflow of cooling air be arranged for through the inlet C, for if this latter alone were relied upon, an undesired portion of the cooling air would be held more or less stationary in the center portion of the chamber and, about the shaft which carries the dough-beating members. With the blades M functioning as in the hollow and cooled central shaft form, this mass of air is steadily beaten outwardly and commingled with the entering air, thus effectively and uniformly cooling the dough mass.

Interiorly of the location on the arms or branches J of the dough rolling bars K are positioned a series of smooth-surfaced bars L, which are designed to only occasionally encounter the top edge of the dough mass F. Extending interiorly from each of these to the drum or hollow shaft G are plates or blades M which, like the rough-rolling bars K, extend substantially the length of the interior measurement of the container B, but whose breadth is, as regards their radial extent, considerably less than the length of the arms or branches J. These plates or blades M are designed to encounter to an even less extent than the bars L any top portion of the dough mass F, their function, as the mechanism formed of themselves, the spider arms J, and dough rollers K rotates, being to keep in a state of agitation, and centrifugally project, the air immediately about the central hollow shaft G, whose temperature is constantly influenced downwardly by the passage through the hollow shaft G of the cooling medium. If this cooled air were allowed to remain relatively unagitated closely about the outer surface of the hollow shaft G, its influence upon the mass of dough, which is constantly beaten toward the periphery of the container B, would be negligible and irregular, and would exert little or no lowering effect upon the temperature of the dough mass, the increased temperature of which, due to the beating of the bars K, it is desired to counteract. With the blades M, however, constantly disturbing this cooled air about the hollow shaft G, and thus driving it toward the periphery of the container B, a steady temperature-lowering influence is exerted upon the air adjacent its outer walls, in some portion of which the dough mass F is being beaten by the repeated and successive impact of the bars K. The air thus thoroughly commingled is steadily reinforced and renewed by the access of fresh air and the more or less circular driving of the incoming air about the container, while the more or less heated air, from whose influence it is desirable to spare the dough mass F is accordingly drawn out through the outlet D.

What I claim is:

1. In a dough-handling mechanism, in combination with a container provided with air inlet and outlet connections, a horizontally disposed hollow shaft passing through said container and through which a flow of refrigerating liquid is adapted to pass, a dough-working member rotatably supported on said shaft within said container, and a plurality of air-agitating blades positioned about the hub of said dough-working member and interiorly of the end portions of the latter, adapted to drive the cooled air adjacent said hollow shaft centrifugally.

2. The combination, with a container, of a rotatable dough-engaging member positioned therewithin, the web of said member being formed as a hollow shaft through which a fluid refrigerant is adapted to be passed, and radially extending vane members extending outwardly from said hollow shaft portion of the dough-engaging member, whereby the air surrounding the same and which has been subjected to the cooling influence thereof is agitated centrifugally.

3. In a dough-manipulating apparatus, in combination with a casing provided with suitably spaced air inlet and outlet connections, an agitating member rotatably journaled therewithin whereby an inserted mass of dough is kneadingly pressed against the interior surface of said casing, a shaft about which said agitating member is positioned, said shaft being formed for the conduct lengthwise of itself of a temperature-influencing medium, and radially extending air-dispersing blades constituting structurally integral projections from the shaft, whereby the air otherwise normally adjacent the latter is driven centrifugally to effect a lowering of the temperature of the mass of dough which is otherwise raised by the agitation thereof.

4. A dough-manipulating apparatus, having, in combination with a generally cylindrically shaped container, an agitating member provided with a hollow shaft rotatably journaled therein, said hollow shaft being adapted to conduct a flow of a cooling medium lengthwise of said container and of said agitating member, and blades of lesser radial extent than the dough-engaging portions of said agitator, extending outwardly at spaced intervals from the periphery of said hollow shaft for centrifugally driving the air cooled by its proximity to said hollow shaft to effect a lowering influence upon a mass of dough placed within said container, whose temperature tends to unduly rise as a result of its manipulation by said agitating member.

5. In a dough-manipulating machine, in combination with a generally cylindrical casing, a dough-agitating member rotatably journaled coaxially thereof, the central shaft portion of said agitating member being formed as a hollow conduit for the movement of a flow of fluid refrigerant through said machine, and a plurality of blade members of lesser radial length than the dough-engaging portions of said agitating member and with their inner edges adjoining said central shaft portion adapted to drive outwardly the air cooled by its proximity to said cooled hollow shaft.

6. A dough-manipulating apparatus, having, in combination with a generally cylindrical container, an agitating member rotatably journaled therein, the central portion of said agitating member being formed as a hollow shaft through which a fluid cooling medium may be passed, blade members spacedly supported by said agitator in position to effect the distribution throughout the container of the air cooled by its initial propinquity to said cooled central shaft, and means for introducing outside air into the container and withdrawing air therefrom.

7. In a dough-manipulating machine, in combination with a generally cylindrical casing, provided with suitable air inlet and outlet connections, a dough-beating member rotatably journaled therewithin, the central shaft portion of said member being hollowed for the flow of a temperature-influencing medium therethrough and a plurality of radially extending blades of lesser outward breadth than the other parts of the dough-beating member, adapted to centrifugally project the air otherwise most closely adjacent the central shaft of said dough-beating member, thereby cooperating with the air inlet and outlet connections in the desired distribution and travel of the air within the container.

In testimony whereof I sign this specification.

JAMES C. GORDON.